US009049727B2

(12) United States Patent
Zhu

(10) Patent No.: US 9,049,727 B2
(45) Date of Patent: *Jun. 2, 2015

(54) MACRO USER EQUIPMENT INITIATED EVOLVED INTER-CELL INTERFERENCE COORDINATION MECHANISM THROUGH PRIVATE FEMTOCELLS

(75) Inventor: Chenxi Zhu, Palo Alto, CA (US)

(73) Assignee: Fujitsu Limited, Kawasaki-shi (JP)

( * ) Notice: Subject to any disclaimer, the term of this patent is extended or adjusted under 35 U.S.C. 154(b) by 531 days.

This patent is subject to a terminal disclaimer.

(21) Appl. No.: 13/051,250

(22) Filed: Mar. 18, 2011

(65) Prior Publication Data

US 2012/0040619 A1 Feb. 16, 2012

Related U.S. Application Data

(60) Provisional application No. 61/373,020, filed on Aug. 12, 2010.

(51) Int. Cl.
H04B 1/00 (2006.01)
H04W 72/08 (2009.01)
H04W 84/04 (2009.01)
H04W 84/10 (2009.01)

(52) U.S. Cl.
CPC .......... *H04W 72/082* (2013.01); *H04W 84/045* (2013.01); *H04W 84/105* (2013.01)

(58) Field of Classification Search
CPC .......................... H04W 72/082; H04W 84/045
USPC ....................................................... 455/63.1
See application file for complete search history.

(56) References Cited

U.S. PATENT DOCUMENTS

| 2009/0131098 | A1* | 5/2009 | Khandekar et al. | 455/525 |
|---|---|---|---|---|
| 2009/0197631 | A1 | 8/2009 | Palanki | |
| 2009/0247172 | A1* | 10/2009 | Palanki et al. | 455/447 |
| 2009/0290550 | A1* | 11/2009 | Bhattad et al. | 370/329 |
| 2009/0291640 | A1* | 11/2009 | Bhattad et al. | 455/63.1 |
| 2010/0111022 | A1 | 5/2010 | Chang | |
| 2010/0124930 | A1 | 5/2010 | Andrews | |
| 2010/0202391 | A1 | 8/2010 | Palanki | |
| 2011/0086651 | A1* | 4/2011 | Li et al. | 455/501 |
| 2011/0116480 | A1* | 5/2011 | Li et al. | 370/332 |
| 2011/0136494 | A1 | 6/2011 | Kim | |
| 2012/0040642 | A1* | 2/2012 | Zhu | 455/411 |

(Continued)

FOREIGN PATENT DOCUMENTS

| EP | 2 160 062 | 3/2010 |
|---|---|---|
| JP | 2007-214763 | 8/2007 |

(Continued)

OTHER PUBLICATIONS

U.S. Appl. No. 13/051,220, filed Mar. 18, 2011, Zhu.

(Continued)

*Primary Examiner* — David Bilodeau
(74) *Attorney, Agent, or Firm* — Baker Botts L.L.P.

(57) ABSTRACT

In one embodiment, a wireless base station, receives a random access preamble from a wireless device that is not authorized to utilize the wireless base station, the random access preamble indicating that the wireless device suffers interference from the wireless base station. The wireless base station sends a random access response to the wireless device; receives an interference stress message from the wireless device; and reduces interference for the wireless device.

37 Claims, 6 Drawing Sheets

(56) References Cited

U.S. PATENT DOCUMENTS

2012/0178482 A1* 7/2012 Seo et al. .................... 455/501
2012/0258724 A1* 10/2012 Kim et al. .................. 455/452.2

FOREIGN PATENT DOCUMENTS

| WO | WO 2009/099813 | 8/2009 |
| WO | WO 2009/143382 | 11/2009 |
| WO | 2010/079999 | 7/2010 |
| WO | WO 2010-079999 A2 | 7/2010 |

OTHER PUBLICATIONS

"Guidelines for Evaluation of Radio Interface Technologies for IMT-Advanced," *Report ITU-R M.2135-1*, Dec. 2009.
Valcarce, Alvaro et al., "Applying FDTD to the Coverage Prediction of WiMAX Femtocells," *EURASIP Journal on Wireless Communications and Networking*, vol. 2009, Article ID 308606, 2009.
Yun, Zhengqing et al., "A Ray-Tracing Method Based on the Triangular Grid Approach and Application to Propagation Prediction in Urban Environments," *IEEE Transactions on Antennas and Propagation*, 50(5), May 2002.
Home Page for the U.S. Census Bureau; http://www.census.gov/, downloaded Jul. 6, 2011, 2011.
Home Page for the USGS Viewer, http://viewer.nationalmap.gov/viewer/, downloaded Jul. 6, 2011, 2011.
Search Report for GB 1113029.1, Nov. 21, 2011.
Search Report for GB 1113375.8, Nov. 21, 2011.
Office Action and Search Report and Written Opinion of the People's Republic of China for CN Application No. 201110260532.5, Aug. 29, 2013.
Office Action and Search Report and Written Opinion of the People's Republic of China for CN Application No. 201110236599.5, Nov. 26, 2013.
Office Action of the People's Republic of China for CN Application No. 201110260532.5, Mar. 25, 2014.
Chinese Office Action with English translation from CN Application No. 201110236599.5 mailed Jul. 22, 2014, 12 pages, Jul. 22, 2014.
Japanese Office Action issued in JP Patent Appl. No. 2011-176037 (w/ English translation), Jan. 23, 2015.
3 GPP TS 36.300 v9.4.0 (Jun. 2010); "3rd Generation Partnership Project; Technical Specification Group Radio Access Network; Evolve Universal Terrestrial Radio Access (E-UTRA) and Evolved Universal Terrestrial Radio Access Network (E-UTRAN; Overall description; Stage 2 (Release 9)", Jun. 18, 2010.

* cited by examiner

US 9,049,727 B2

MACRO USER EQUIPMENT INITIATED EVOLVED INTER-CELL INTERFERENCE COORDINATION MECHANISM THROUGH PRIVATE FEMTOCELLS

CROSS REFERENCE TO RELATED APPLICATION

This application claims benefit under 35 U.S.C. §119(e) of U.S. Provisional Patent Application No. 61/373,020, entitled MUE Initiated eICIC Through CSG Femto eNB, filed on 12 Aug. 2010, which is hereby incorporated by reference in its entirety and for all purposes.

TECHNICAL FIELD

This disclosure generally relates to wireless communications and more specifically relates to inter-cell interference coordination between wireless devices and wireless base stations.

BACKGROUND

In a wireless communications network, there may be any number of wireless base stations, each installed at a fixed location, that serve individual wireless devices in the network. For example, in a cellular network, there may be any number of wireless base stations serving individual cellular telephones. More specifically, in a cellular radio system, a land area to be supplied with radio service is typically divided into regular shaped cells, each served by at least one fixed-location transceiver known as a cell site or a base station. When joined together these cells provide radio coverage over a wide geographic area. This enables a large number of portable transceivers (e.g., mobile telephones, pagers, etc.) to communicate with each other and with fixed transceivers and telephones anywhere in the network, via base stations, even if some of the transceivers are moving through more than one cell during transmission.

DESCRIPTION OF EXAMPLE EMBODIMENTS

Figure 1:
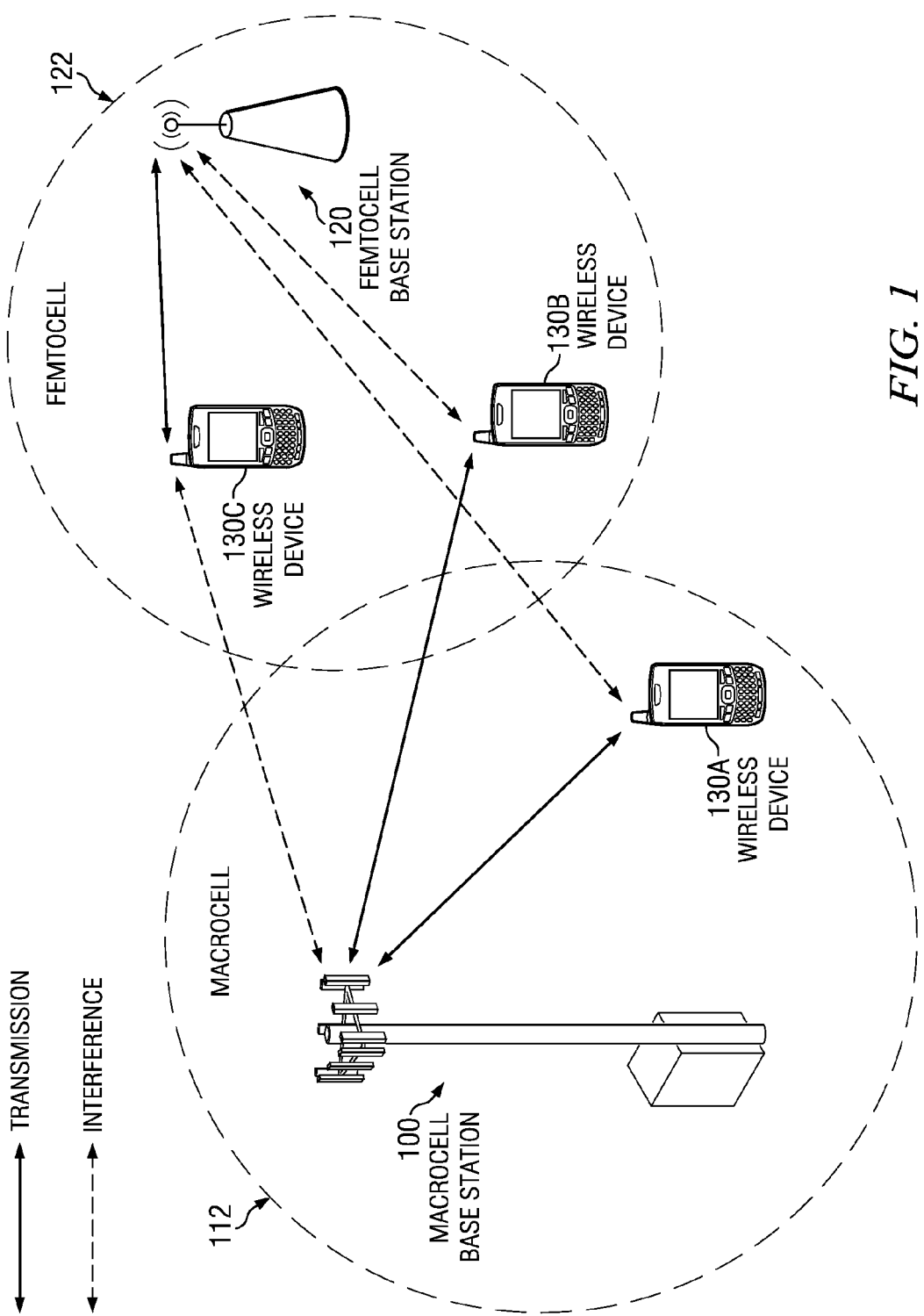
FIG. 1 illustrates a portion an example cellular network.

A cellular network is a radio network distributed over land areas called cells, each served by at least one fixed-location transceiver known as a cell site or a base station. When joined together these cells provide radio coverage over a wide geographic area. This enables a large number of portable transceivers (e.g., mobile telephones, pagers, etc.) to communicate with each other and with fixed transceivers and telephones anywhere in the network, via base stations, even if some of the transceivers are moving through more than one cell during transmission.

There may be several types of cells in a cellular network. For example, a macrocell is a cell that provides radio coverage over a relatively large area and is served by a powerful cellular base station. The antennas for macrocells are usually mounted on ground-based masts, rooftops, and other existing structures, at a height that provides a clear view over the surrounding buildings and terrain. Macrocell base stations typically have power outputs of tens of watts. A microcell is a cell served by a low power cellular base station, and covers a limited area such as a mall, a hotel, or a transpiration hub. Generally, microcells provide coverage areas smaller than macrocells. A microcell uses power control to limit the radius of its coverage area. A picocell is a small cell typically covering a small area, such as inside a building (e.g., offices, shopping malls, train stations, etc.), or more recently inside an aircraft. A picocell is usually smaller than a microcell, though the distinction is not always clear. Picocells are typically used to extend coverage to indoor areas where outdoor signals do not reach well, or to add network capacity in areas with very dense telephone usage (e.g., train stations). Picocells provide coverage and capacity in areas difficult or expensive to reach using the more traditional macrocell approach. A femtocell is another small cell typically designed to use in a home or a small business. A femtocell connects to a service provider's network via broadband (e.g., DSL or cable). Current designs of femtocells typically support two to four active mobile telephones in residential settings, and eight to sixteen active mobile telephones in enterprise settings. A femtocell allows service providers to extend service coverage indoors, especially where access would otherwise be limited or unavailable.

In a cellular network, a portable wireless device (e.g., mobile telephones, pagers, etc.) located in a specific cell may communicate with the other devices in the network via the base stations serving that cell, by transmitting and receiving data packets through the base stations serving that cell. If the portable wireless device moves to another cell, it may communicate with the other devices in the network via the base stations serving the second cell, again, by transmitting and receiving data packets through the base stations serving the second cell.

In particular embodiments, in a cellular network, there may be cells that serve all wireless devices belonging to the network, and there may be cells that serve only specific sets of wireless devices belonging to the network. The former may be referred to as "public cells", and the latter may be referred to as "private cells". Examples of public cells may include, without limitation, macrocells, microcells, and picocells. Examples of private cells may include, without limitation, picocells and femtocells. In particular embodiments, a wireless device belonging to a cellular network may utilize the base stations serving any public cell to communicate with the other devices also in the network. On the other hand, for a private cell, only a wireless device that belongs to the cellular network and is also authorized to use the private cell may utilize the base station serving the private cell to communicate with the other devices in the network.

FIG. 1 illustrates a portion of an example cellular network that includes a public cell 112 and a private cell 122. In particular embodiments, public cell 112 may be a macrocell, and private cell 122 may be a femtocell. In particular embodiments, there may be one or more base stations 110 serving macrocell 112 (hereafter referred to as "macrocell base station"). Similarly, there may be one or more base stations 120 serving femtocell 122 (hereafter referred to as "femtocell base station").

In particular embodiments, macrocell 112 may serve a relatively large area, while femtocell 122 may serve a relatively small area (e.g., a home, an office, etc.). In particular embodiments, any wireless device in the network may utilize macrocell base station 110 to communicate with the other devices in the network. On the other hand, only a specific set of wireless devices in the network that are also authorized to use femtocell 122 may utilize femtocell base station 120 to communicate with the other devices in the network. For example, in FIG. 1, suppose wireless devices 130A, 130B, 130C all belong to the network and thus can all utilize macrocell base station 110, but only wireless device 130C is authorized to utilize femtocell base station 120 and wireless devices 130A and 130B are not authorized to use femtocell base station 120. In particular embodiments, wireless devices 130A, 130B, 130C may each be a mobile or cellular telephone, and may also be referred to as "user equipment".

In particular embodiments, a femtocell base station (e.g., femtocell base station 120) may communicate with each wireless device (e.g., wireless device 130C) authorized to utilize the femtocell base station using the 3GPP (3rd Generation Partnership Project) LTE (Long Term Evolution) standard. In particular embodiments, a femtocell base station (e.g., femtocell base station 120) may be connected to an Internet connection (e.g., through an Ethernet connection) available at the location where femtocell base station 120 is installed (e.g., the Internet connection available at the home or office where femtocell base station 120 is installed). Data packets to and from wireless device 130C may be received and transmitted over the Internet connection.

In particular embodiments, there may be one or more specific wireless devices (e.g., wireless device 130C) that are authorized to utilize a femtocell base station (e.g., femtocell base station 120) to communicate with the other devices in the network. In particular embodiments, femtocell base station 120 only services and responds to requests from an authorized wireless device (e.g., wireless device 130C), and ignores requests from any unauthorized wireless device (e.g., wireless devices 130A and 130B). In particular embodiments, femtocell base station 120 may maintain a list of identifiers of the authorized wireless devices in order to determine which wireless device is authorized to utilize it and which is not. In particular embodiments, a wireless device (e.g., wireless device 130C) may maintain a list of identifiers of the femtocells that the wireless device is authorize to use so that the wireless device only utilizes those femtocell base stations that it is authorized to utilize.

In particular embodiments, there may be interferences from specific wireless base stations to specific wireless devices, due to the wireless base stations transmitting various types signals at various times. For example, in FIG. 1, wireless devices 130A and 130B are not authorized to utilize femtocell base station 120, and can only use macrocell base station 110. Yet, femtocell base station 120 may cause interferences to wireless devices 130A and 130B, especially when wireless devices 130A and 130B get closer to femtocell base station 120. Wireless device 130C is authorized to utilize both femtocell base station 120 and macrocell base station 110. When wireless device 130C is closer to femtocell base station 120, it may be preferable for wireless device 130C to communicate with other devices via femtocell base station 120 because femtocell base station 120 provides stronger, clearer signals under the circumstances, and yet, macrocell base station 110 may cause interferences to wireless device 130C.

Sometimes, the interferences from one wireless base station may be so strong, and thus bad, that a wireless device may not be able to communicate with another wireless base station at all. For example, in FIG. 1, wireless device 130B may be sufficiently close to femtocell base station 120 such that, in the worst case scenario, the interferences from femtocell base station 120 may completely prevent wireless device 130B from communicating with macrocell base station 110.

There may be several approaches to address the problem of a wireless base station (e.g., femtocell base station 120) causing interferences to a wireless device (e.g., wireless device 130A or wireless device 130B), especially to a wireless device not authorized to utilize the wireless base station. Particular embodiments may provide a time domain approach to the problem. In this case, a first wireless base station (e.g., femtocell base station 120) may reduce its interferences to a wireless device by not transmitting in some subframes. The wireless device may then use those subframes, in which the first wireless base station does not transmit, to communicate with a second wireless base station (e.g., macrocell base station 110). Alternatively, particular embodiments may provide a frequency domain approach. In this case, a first wireless base station (e.g., femtocell base station 120) may reduce its interferences to a wireless device by limiting its air resource usage to a part of the frequencies and not transmitting in some frequencies. The wireless device may use those frequencies, in which the first wireless base station does not transmit, to communicate with a second wireless base station (e.g., macrocell base station 110). Alternatively, particular embodiments may provide a power control based approach. In this case, a first wireless base station (e.g., femtocell base station 120) may reduce its interferences to a wireless device by reducing its transmission power when necessary. However, all of these approaches require that the wireless device maintaining its connection with the second base station (e.g., macrocell base station 110) for signaling. That is, the wireless device needs to be able to communicate with the second base station in order to indicate to the second base station that it is suffering from the interferences from the first base station. Only then can the second base station communicate with the first base station to request that the first base station reduces its interferences for the wireless device. Yet, under some circumstances, the interferences from the first base station (e.g., femtocell base station 120) to the wireless device (e.g., wireless device 130A or 130B) may be so strong (e.g., when the wireless device is very close to the first base station, when there is a sudden increase in interferences from the first base station, or when there is a sudden decrease of signal strength from the second base station) such that the wireless device may not be able to maintain any connection with the second base station. Consequently, in such cases, the wireless device cannot inform the second base station at all that it is suffering from the interferences from the first base station.

Particular embodiments address the problem of a wireless base station (e.g., femtocell base station 120) causing interferences to a wireless device (e.g., wireless device 130A or 130B), especially to a wireless device not authorized to utilize the wireless base station, by enabling the wireless device to initiate an evolved Inter-Cell Interference Coordination (eICIC) mechanism through the wireless base station. In particular embodiments, the wireless device may initiate eICIC when necessary (e.g., when the wireless device suffers interferences from the wireless base station).

Figure 2:
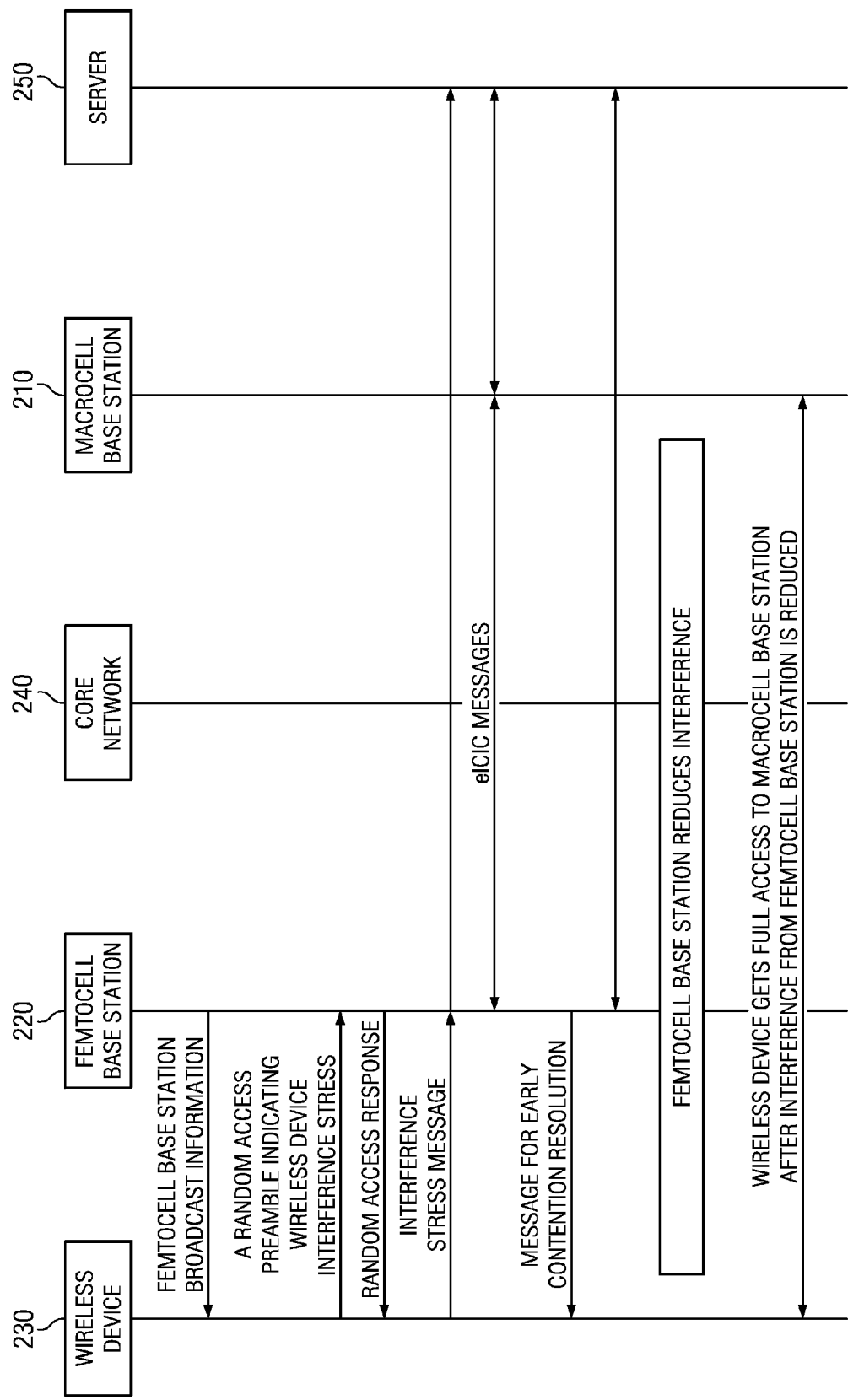
FIG. 2 illustrates a first example message flow for reducing interference caused by a wireless base station to a wireless device not authorized to utilize the wireless base station.
Figure 3:
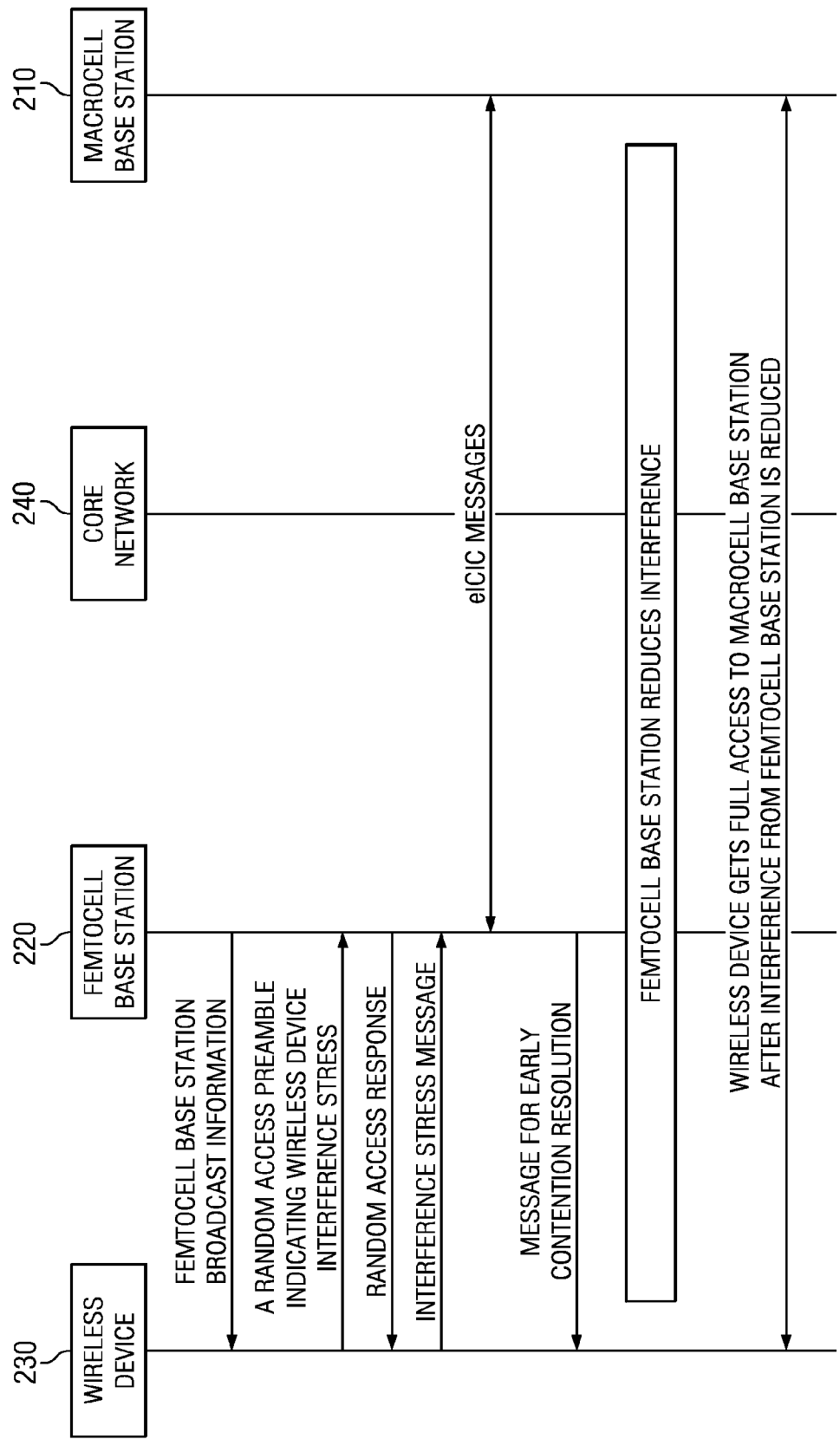
FIG. 3 illustrates a second example message flow for reducing interference caused by a wireless base station to a wireless device not authorized to utilize the wireless base station.
Figure 4:
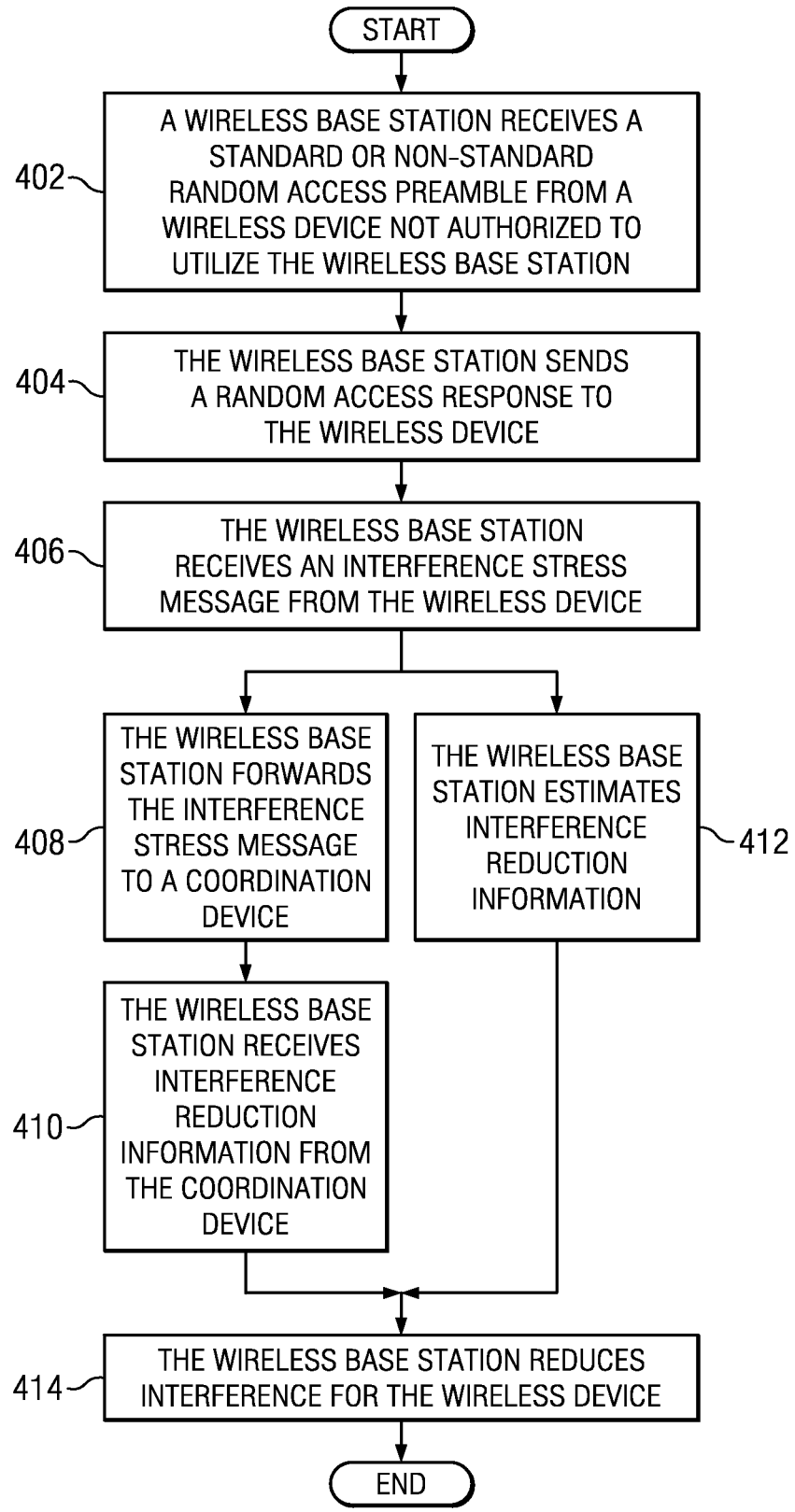
FIG. 4 illustrates an example method for reducing interference caused by a wireless base station to a wireless device not authorized to utilize the wireless base station.

FIG. 2 illustrates a first example message flow for reducing interference caused by a wireless base station to a wireless device not authorized to utilize the wireless base station. FIG. 3 illustrates a second example message flow for reducing interference caused by a wireless base station to a wireless device not authorized to utilize the base station. FIG. 4 illustrates an example method for reducing interference caused by a wireless base station to a wireless device not authorized to utilize the wireless base station. The steps illustrated in FIG. 4 are described in connection with the message flows illustrated in FIGS. 2 and 3.

In particular embodiments, there are two wireless base stations (i.e., a first wireless base station and a second wireless base station) and a wireless device involved. For example, the first wireless base station may be a femtocell base station; the second wireless base station may be a macrocell base station; and the wireless device may be a cellular telephone. In FIGS. 2 and 3, femtocell base station 220 is an example of the first base station; macrocell base station 210 is an example of the second base station; and wireless device 230 is an example of the wireless device. In particular embodiments, the wireless device is authorized to utilize (e.g., connect to and communicate with) the second wireless base station, but is not authorized to utilize the first wireless base station. For example, in FIGS. 2 and 3, wireless device 230 is authorized to utilize macrocell base station 210, but is not authorized to utilize femtocell base station 220. In particular embodiments, the wireless device suffers interferences from the first wireless base station. For example, in FIGS. 2 and 3, wireless device 230 suffers interferences from femtocell base station 220. Suppose that wireless device 230 wishes to initiate eICIC to have femtocell base station 220 reduce its interferences so that wireless device 230 may connect to and utilize macrocell base station 210.

In particular embodiments, femtocell base station 220 may broadcast its information to wireless devices within its signal range. This information enables a wireless device to initiate a connection with femtocell base station 220. In particular embodiments, wireless device 230 may initiate communication with femtocell base station 220 by transmitting a random access procedure preamble to femtocell base station 220, as illustrated in STEP 402. Because wireless device 230 is not authorized to utilize (e.g., connect to and communicate with) femtocell base station 220, this random access procedure preamble may indicate to femtocell base station 220 that wireless device 230 is suffering interference stress caused by femtocell base station 220. In particular embodiments, the random access procedure preamble may be a standard random access procedure preamble. Alternatively, in particular embodiments, the random access procedure preamble may be a special, non-standard random access procedure preamble. For example, a set of preambles may be reserved for the purpose of managing interferences. These special preambles may be referred to as non-standard random access procedure preambles to distinguish them from the standard random access procedure preambles used for regular network access. In the non-standard case, the non-standard random access procedure preamble may, although not necessarily, include some information specifically relevant to the interference stress. In particular embodiments, femtocell base station 220 may assign a different priority (e.g., a higher priority) to wireless device 230 if wireless device 230 has sent a non-standard random access procedure preamble. For example, femtocell base station 220 may respond to the non-standard random access procedure preamble sent by wireless device 230 as soon as possible so that wireless device 230 does not need to suffer the interference stress for long. On the other hand, if wireless device 230 has sent a standard random access procedure preamble, femtocell base station 220 still responds to the standard random access procedure preamble as it normally does but may not give wireless device 230 a higher priority so that there may be some delay before the interference is reduced for wireless device 230.

In particular embodiments, even though wireless device 230 is not authorized to connect with femtocell base station 220, femtocell base station 220 nevertheless transmits a random access response to wireless device 230 upon receiving the random access procedure preamble from wireless device 230, as illustrated in STEP 404. Femtocell base station 220 treats this communication from wireless device 230 as a special case and does not ignore wireless device 230.

In particular embodiments, upon receiving the random access response from femtocell base station 220, wireless device 230 transmits an interference stress message to femtocell base station 220, as illustrated in STEP 406. In this case, the interference stress message becomes a part of the random access procedure (e.g., replacing the standard third message of the random access procedure between femtocell base station 220 and wireless device 230). The interference stress message indicates to femtocell base station 220 that wireless device 230 is suffering interferences from femtocell base station 220. In particular embodiments, the interference stress message may include an identifier of femtocell base station 220, one or more measurements of the interferences, and any other applicable information.

Upon receiving the interference stress message from wireless device 230, femtocell base station 220 may respond in several ways. In particular embodiments, femtocell base station 220 may forward the interference stress message to a coordination device over the network, as illustrated in STEP 408. FIG. 2 illustrates an example of this response. In particular embodiments, the coordination device may be a self-organizing network server in the cellular network for interference coordination. The coordination device may have information about many parts of the network (e.g., having a comprehensive view of the network and information about many base stations in the network) so that the coordination device may determine how to appropriately reduce interferences for each base station. In FIG. 2, server 250 is an example of the coordination device. Femtocell base station 220 may forward the interference stress message to server 250 over core network 240. Upon receiving the interference stress message from femtocell base station 220, server 250 may determine what femtocell base station 220 should do in order to sufficiently reduce its interferences for wireless device 230 based on the information provided in the interference stress message (e.g., interference measurements) as well as the information server 250 has about the network itself. The interference reduction information determined by server 250 for femtocell base station 220 may indicate what interference reduction approach (e.g., time domain approach, frequency domain approach, or power control based approach) to be used and the specific actions to be taken by femtocell base station 220. In particular embodiments, server 250 may transmit the interference reduction information to femtocell base station 220 over core network 240, as illustrated in STEP 410. In particular embodiments, the interference reduction information may be sent to femtocell base station 220 as one or more eICIC messages. In addition, in particular embodiments, femtocell base station 220 may coordinate with macrocell base station 210 over core network 240 using one or more eICIC messages.

Alternatively, in particular embodiments, there may not be a coordination device (e.g., server 250) available in the network. In this case, femtocell base station 220 may estimate for itself how best to reduce its interferences for wireless device 230 based on the information provided in the interference stress message (e.g., interference measurements), as illustrated in STEP 412. FIG. 3 illustrates an example of this response. For example, femtocell base station 220 may determine for itself the interference reduction approach (e.g., time domain approach, frequency domain approach, or power control based approach) to be used and the specific actions to be taken. In addition, in particular embodiments, femtocell base station 220 may coordinate with macrocell base station 210 over core network 240 using one or more eICIC messages.

In particular embodiments, femtocell base station 220 may inform wireless device 230 that it is about to reduce its interferences for wireless device 230. In particular embodiments, femtocell base station 220 may reduce its interferences for wireless device 230 based on the interference reduction information either received from server 250 (as illustrated in FIG. 2) or estimated by femtocell base station 220 itself (as illustrated in FIG. 3), as illustrated in STEP 414. For example, the interference reduction information may instruct femtocell base station 220 to use the time domain approach and what specific subframes to transmit and what specific subframes not to transmit. Alternatively, the interference reduction information may instruct femtocell base station 220 to use the frequency domain approach and what specific frequencies to transmit and what specific frequencies not to transmit. Alternatively, the interference reduction information may instruct femtocell base station 220 to use the power control based approach and the amount of power to reduce. Once femtocell base station 220 has sufficiently reduced its interferences to wireless device 230, wireless device 230 may connect to and communicated with macrocell base station 210.

Figure 5:
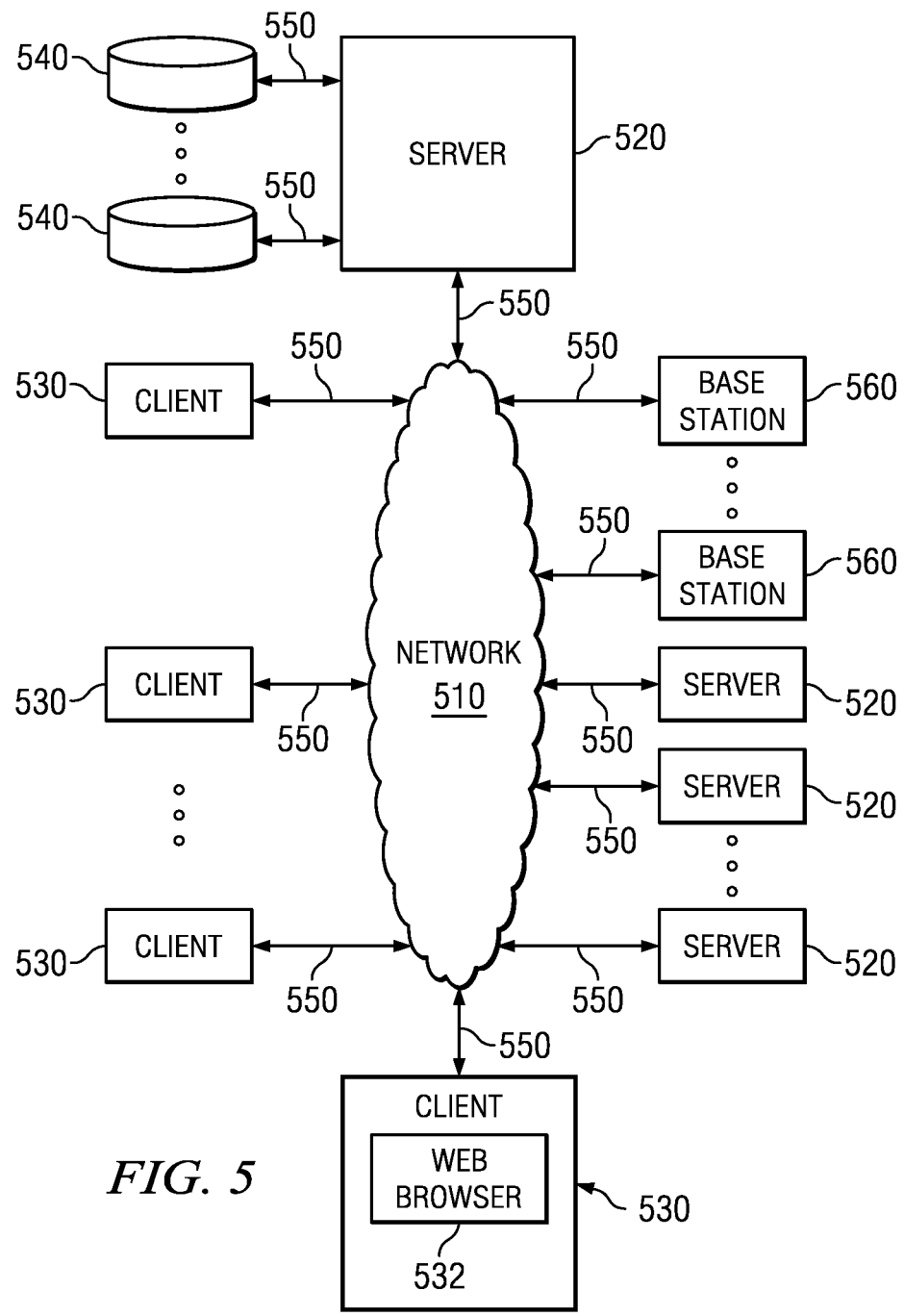
FIG. 5 illustrates an example network environment.

Particular embodiments may be implemented in a network environment. FIG. 5 illustrates an example network environment 500, which may be a cellular network environment. Network environment 500 includes a network 510 coupling one or more servers 520 and one or more clients 530 to each other. In particular embodiments, network 510 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 510. This disclosure contemplates any suitable network 510.

One or more links 550 couple a server 520 or a client 530 to network 510. In particular embodiments, one or more links 550 each includes one or more wireline, wireless, or optical links 550. In particular embodiments, one or more links 550 each includes an intranet, an extranet, a VPN, a LAN, a WLAN, a WAN, a MAN, a portion of the Internet, or another link 550 or a combination of two or more such links 550. This disclosure contemplates any suitable links 550 coupling servers 520 and clients 530 to network 510.

In particular embodiments, each server 520 may be a unitary server or may be a distributed server spanning multiple computers or multiple datacenters. Servers 520 may be of various types, such as, for example and without limitation, web server, news server, mail server, message server, advertising server, file server, application server, exchange server, database server, or proxy server. In particular embodiments, each server 520 may include hardware, software, or embedded logic components or a combination of two or more such components for carrying out the appropriate functionalities implemented or supported by server 520. For example, a web server is generally capable of hosting websites containing web pages or particular elements of web pages. More specifically, a web server may host HTML files or other file types, or may dynamically create or constitute files upon a request, and may communicate them to clients 530 in response to HTTP or other requests from clients 530. A mail server is generally capable of providing electronic mail services to various clients 530. A database server is generally capable of providing an interface for managing data stored in one or more data stores. One or more servers 520 may be coordination servers.

In particular embodiments, one or more data storages 540 may be communicatively linked to one or more severs 520 via one or more links 550. In particular embodiments, data storages 540 may be used to store various types of information. In particular embodiments, the information stored in data storages 540 may be organized according to specific data structures. In particular embodiment, each data storage 540 may be a relational database. Particular embodiments may provide interfaces that enable servers 520 or clients 530 to manage, e.g., retrieve, modify, add, or delete, the information stored in data storage 540.

In particular embodiments, each client 530 may be an electronic device including hardware, software, or embedded logic components or a combination of two or more such components and capable of carrying out the appropriate functionalities implemented or supported by client 530. For example and without limitation, a client 530 may be a desktop computer system, a notebook computer system, a netbook computer system, a handheld electronic device, or a mobile telephone. This disclosure contemplates any suitable clients 530. A client 530 may enable a network user at client 530 to access network 530. A client 530 may enable its user to communicate with other users at other clients 530.

A client 530 may have a web browser 532, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 530 may enter a Uniform Resource Locator (URL) or other address directing the web browser 532 to a server 520, and the web browser 532 may generate a Hyper Text Transfer Protocol (HTTP) request and communicate the HTTP request to server 520. Server 520 may accept the HTTP request and communicate to client 530 one or more Hyper Text Markup Language (HTML) files responsive to the HTTP request. Client 530 may render a web page based on the HTML files from server 520 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

In particular embodiments, there may be one or more base stations 560 in network 500. Each base station 560 may serve a cell of network 500 and each cell may be served by one or more base stations 560. Each base station 560 may have a transceiver for transmitting communication packets to and receiving communication packets from one or more wireless devices (e.g., clients 230).

Figure 6:
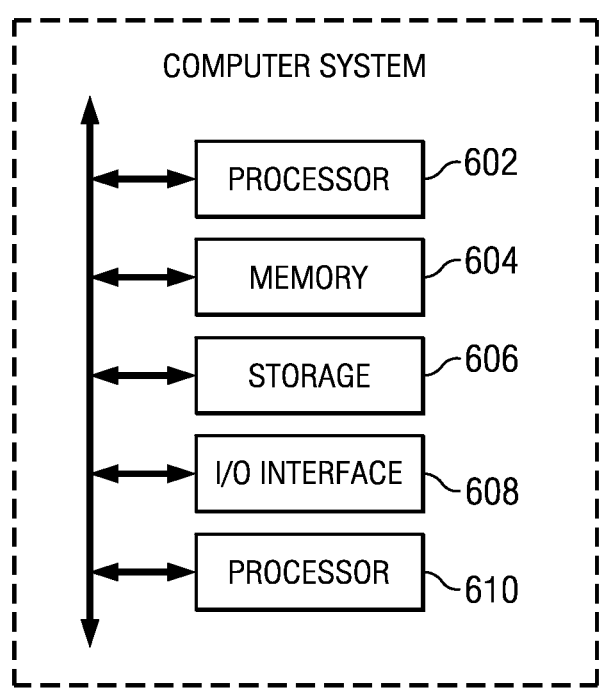
FIG. 6 illustrates an example computer system.

Particular embodiments may be implemented on one or more computer systems. FIG. 6 illustrates an example computer system 600. For example, computer system 600 may be a base station. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a first wireless base station, receiving a random access preamble from a wireless device that is not authorized to utilize the first wireless base station, the random access preamble indicating that the wireless device suffers interference from the first wireless base station;
   by the first wireless base station, sending a random access response to the wireless device;
   by the first wireless base station, receiving an interference stress message from the wireless device;
   by the first wireless base station, determining whether a coordination device is available;
   by the first wireless base station, if the coordination device is available:
      forwarding the interference stress message to the coordination device;
      receiving interference reduction information from the coordination device; and
      reducing interference for the wireless device based at least in part on the interference reduction information; and
   by the first wireless base station, if the coordination device is not available, reducing interference for the wireless device based at least in part on the interference stress message.

2. The method of claim 1, wherein the first wireless base station is a femtocell base station.

3. The method of claim 1, wherein the wireless device is authorized to utilize one or more non-interfering second base stations, the one or more non-interfering second base stations being coupled to the coordination device.

4. The method of claim 3, wherein the non-interfering second base stations are one or more macrocell base stations.

5. The method of claim 3, further comprising:
   if the coordination device is available, estimating how much interference reduction is necessary for the wireless device to utilize at least one of the non-interfering second base stations based at least in part on the interference stress message.

6. The method of claim 3, wherein each of the interference stress message and the interference reduction information indicates how much interference reduction is necessary for the wireless device to utilize at least one of the non-interfering second base stations.

7. The method of claim 3, wherein:
   the coordination device is a self-organizing network server; and
   the coordination device estimates the interference reduction information based on the interference stress message.

8. The method of claim 3, wherein the interference stress message is forwarded to the coordination device as one or more wireless data packets.

9. The method of claim 1, wherein the interference stress message comprises one or more interference measurements.

10. The method of claim 1, wherein the random access preamble is a standard random access preamble.

11. The method of claim 1, wherein the random access preamble is a non-standard random access preamble.

12. The method of claim 11, further comprising:
   by the first wireless base station, assigning a higher priority to the wireless device sending the non-standard random access preamble.

13. A first wireless base station comprising:
   a memory comprising instructions executable by one or more processors; and
   the one or more processors coupled to the memory and operable to execute the instructions, the one or more processors being operable when executing the instructions to:
      receive a random access preamble from a wireless device that is not authorized to utilize the first wireless base station, the random access preamble indicating that the wireless device suffers interference from the first wireless base station;
      send a random access response to the wireless device;
      receive an interference stress message from the wireless device;
      determine whether a coordination device is available;
      if the coordination device is available:
         forward the interference stress message to the coordination device;
         receive interference reduction information from the coordination device; and
         reduce interference for the wireless device based at least in part on the interference reduction information; and
      if the coordination device is not available, reduce interference for the wireless device based at least in part on the interference stress message.

14. The first wireless base station of claim 13, wherein the first wireless base station is a femtocell base station.

15. The first wireless base station of claim 13, wherein the wireless device is authorized to utilize one or more non-interfering second base stations, the one or more non-interfering second base stations being coupled to the coordination device.

16. The first wireless base station of claim 15, wherein the non-interfering second base stations are one or more macrocell base stations, 17. The first wireless base station of claim 15, wherein the processors are further operable when executing the instructions to:
   if the coordination device is available, estimate how much interference reduction is necessary for the wireless device to utilize at least one of the non-interfering second base stations based at least in part on the interference stress message.

18. The first wireless base station of claim 15, wherein each of the interference stress message and the interference reduction information indicates how much interference reduction is necessary for the wireless device to utilize at least one of the non-interfering second base stations.

19. The first wireless base station of claim 15, wherein:
the coordination device is a self-organizing network server; and
the coordination device estimates the interference reduction information based on the interference stress message.

20. The first wireless base station of claim 15, wherein the interference stress message is forwarded to the coordination device as one or more wireless data packets.

21. The first wireless base station of claim 13, wherein the interference stress message comprises one or more interference measurements.

22. The first wireless base station of claim 13, wherein the random access preamble is a standard random access preamble.

23. The first wireless base station of claim 13, wherein the random access preamble is a non-standard random access preamble.

24. The first wireless base station of claim 23, wherein the processors are further operable when executing the instructions to assign a higher priority to the wireless device sending the non-standard random access preamble.

25. One or more computer-readable non-transitory storage media embodying logic that is operable when executed to:
by a first wireless base station, receive a random access preamble from a wireless device that is not authorized to utilize the first wireless base station, the random access preamble indicating that the wireless device suffers interference from the first wireless base station;
by the first wireless base station, send a random access response to the wireless device;
by the first wireless base station, receive an interference stress message from the wireless device;
by the first wireless base station, determine whether a coordination device is available;
by the first wireless base station, if the coordination device is available:
forward the interference stress message to the coordination device;
receive interference reduction information from the coordination device; and
reduce interference for the wireless device based at east in part on the interference reduction information; and
by the first wireless base station, if the coordination device is not available, reduce interference for the wireless device based at least in part on the interference stress message.

26. The media of claim 25, wherein the first wireless base station is a femtocell base station.

27. The media of claim 25, wherein the wireless device is authorized to utilize one or more non-interfering second base stations, the one or more non-interfering second base stations being coupled to the coordination device.

28. The media of claim 27, wherein the non-interfering second base stations are one or more macrocell base stations.

29. The media of claim 27, wherein the logic is further operable when executed by the first wireless base station to:
if the coordination device is available, estimate how much interference reduction is necessary for the wireless device to utilize at least one of the non-interfering second base stations based at least in part on the interference stress message.

30. The media of claim 27, wherein each of the interference stress message and the interference reduction information indicates how much interference reduction is necessary for the wireless device to utilize at least one of the non-interfering second base stations.

31. The media of claim 27, wherein:
the coordination device is a self-organizing network server; and
the coordination device estimates the interference reduction information based on the interference stress message.

32. The media of claim 27, wherein the interference stress message is forwarded to the coordination device as one or more wireless data packets.

33. The media of claim 25, wherein the interference stress message comprises one or more interference measurements.

34. The media of claim 25, wherein the random access preamble is a standard random access preamble.

35. The media of claim 25, wherein the random. access preamble is a non-standard random access preamble.

36. The media of claim 35, wherein the logic is further operable when executed by the first wireless base station to assign a higher priority to the wireless device sending the non-standard random access preamble.

37. A system comprising:
means for receiving a random access preamble from a wireless device that is not authorized to utilize the system, the random access preamble indicating that the wireless device suffers interference from the system;
means for sending a random access response to the wireless device;
means for receiving an interference stress message from the wireless device;
means for determining whether a coordination device is available;
means for, if the coordination device is available:
forwarding the interference stress message to the coordination device;
receiving interference reduction information from the coordination device; and
reducing interference for the wireless device based at least in part on the interference reduction information; and
means for, if the coordination device is not available, reducing interference for the wireless device based at least in part on the interference stress message.

* * * * *